United States Patent Office 3,070,579
Patented Dec. 25, 1962

3,070,579
VINYL AROMATIC POLYMERS HAVING REACTIVE END GROUPS AND PROCESS FOR MAKING THE SAME
Michael M. Szwarc, Syracuse, N.Y., assignor to The Dow Chemical Company, Midland, Mich., a corporation of Delaware
No Drawing. Filed Sept. 15, 1958, Ser. No. 760,865
11 Claims. (Cl. 260—79)

This invention concerns alkenyl aromatic hydrocarbon polymers having reactive end groups on the polymer chains in the molecule and relates to a process for making the same.

It is known to prepare polymers of ethylenically unsaturated organic compounds having conjugated double bonds at least one of which double bonds occurs in an aliphatic radical by treating a monomer such as butadiene, isoprene, dimethylbutadiene, styrene and the like, with an ether solution of an addition compound of an alkali metal and a polycyclic aromatic compound as the catalyst or polymerization initiator.

It is known that solutions of such polymers prepared in an anhydrous organic ether as reaction medium consist of polymer molecules having reactive negatively charged end groups and are referred to as "living" polymers. So long as the polymer is maintained free from contact with agents, e.g. oxygen or water, which kill the living polymer, the polymer molecules can grow to any desired molecular weight by adding monomer to the system and continuing the polymerization. Thus polymeric bodies of monoalkenyl aromatic hydrocarbons, e.g. styrene, can readily be prepared having a desired molecular weight by controlling the relative proportions of the catalyst material and the monomer employed, and the polymerization conditions.

It has now been discovered that polymeric compositions of matter consisting of polymerized monoalkenyl aromatic hydrocarbons having reactive end groups such as carboxylic acid groups, carbodithiolic acid groups, hydroxypropyl or 2-hydroxyethyl groups attached to the terminal carbon atoms of the polymer chains can readily be obtained by reacting the "living" polymer, i.e. a polymerized monoalkenyl aromatic hydrocarbon having reactive negatively charged end groups, with a compound such as carbon dioxide, carbon bisulfide, 1,2-propylene oxide or ethylene oxide while having the reactants dissolved in a liquid solvent such as an anhydrous organic ether, preferably the liquid ether solvent in which the living polymer is prepared.

More specifically, the invention concerns polymeric compositions of matter comprising a polymerized monoalkenyl aromatic hydrocarbon of the benzene series consisting of at least 10 chemically combined monomer units having a single aliphatic ethylenic double bond in conjugation with aromatic unsaturation in the benzene nucleus, which polymer contains on the terminal carbon atoms of the polymer chains in the polymer molecule substituent radicals selected from the group consisting of the carboxy radical of the formula —COOH, the carbodithio radical of the formula —CSSH, the hydroxypropyl radical of the formula —$C_3H_6OH$ and the 2-hydroxyethyl radical of the formula —$CH_2 \cdot CH_2OH$, and wherein each terminal carbon atom of the polymer chain contains a substituent radical of the kind above stated.

The polymeric compositions thus contain in the polymer molecule two carboxylic acid groups, two carbodithiolic acid groups or two hydroxyl groups in the terminal groups on the ends of the polymer chains in the polymer molecule.

The compositions of the invention are useful for making molded articles such as cups, boxes, plastic tags, or name plates. Because of their reactive end groups the bifunctional polymeric products can be reacted with other groups or compounds to form new compositions. For example, the polymeric products containing carboxylic acid groups can be reacted with alcohols, glycols or ether alcohols to form the corresponding derivatives. The polymers containing the carboxylic acid end groups can be reacted with the polymeric products containing hydroxyl end groups to form condensation or block polymers of higher molecular weight. The polymers of the invention are useful in the preparation of adhesives for glass, metal, wood, paper, etc., by dissolving the polymer in a suitable volatile solvent. The polymeric products containing the reactive acidic end groups can be converted to salts by reaction with an alkali, an alkali metal or an alkaline earth metal. Salts of the polymers associate so that upon heating the same to a plastic condition under usual molding conditions the polymer readily flows under an applied pressure, but has improved mechanical properties at ordinary temperatures.

The living polymer starting material having reactive negatively charged end groups to be employed can be prepared in known ways. In brief, a monoalkenyl aromatic resin having reactive negatively charged end groups can be prepared by polymerizing a monomeric monoalkenyl aromatic hydrocarbon such as styrene, vinyltoluene, vinylxylene, isopropylstyrene, ethylvinylbenzene, tert-butylstyrene, alpha-methyl styrene, alpha-ethyl styrene, para-methyl-alpha-methyl styrene, having a single benzene nucleus and a single ethylenic double bond in conjugation with aromatic unsaturation in the benzene nucleus, in the presence of an anionic catalyst while having the reactants dissolved in a suitable solvent which is free or substantially free from impurities which act as terminators for the growing polymer chains having the negatively charged end groups.

Examples of suitable catalyst materials for initiating the polymerization reaction are the addition compounds of alkali metals such as sodium, potassium or lithium with polynuclear aromatic compounds, e.g. phenanthrene, or diphenyl, or the addition compound of an alkali metal with alpha-methyl styrene or compounds such as butyl lithium. The catalyst material is usually employed in amounts corresponding to from 0.0005 to 0.04 gram molecular proportion per gram molecular equivalent proportion of the monoalkenyl aromatic hydrocarbon to be polymerized.

The polymerization is carried out while having the catalyst material and the polymer being formed dissolved in a suitable anhydrous organic solvent which is a liquid under the conditions employed, suitably an organic ether which is non-reactive with the monomer, the polymer or the catalyst material. Suitable solvents are aliphatic ethers such as dimethyl ether, methyl ethyl ether, methyl isopropyl ether, dimethyl ether of ethylene glycol, or cyclic ethers, e.g. 1,4-dioxane, tetrahydropyrane, tetrahydrofurane, or tetrahydro-2-methylfurane and the like. The cyclic organic ethers are preferred.

The polymerization can be carried out at temperatures between —120° and 60° C., preferably from —80° to 50° C. and at atmospheric, subatmospheric or superatmospheric pressure.

It is important that the polymerization be carried out in an inert atmosphere and under anhydrous or as nearly anhydrous conditions as practical and in the absence or substantial absence of impurities or agents which act as terminators to destroy or kill the living polymer prior to completing the polymerization reaction.

The polymerization of the monomers can be easily controlled to form polymers of any desired molecular weight by controlling the monomer to catalyst ratio.

The compositions of the invention are prepared by reacting the living polymerized monoalkenyl aromatic hydrocarbon having reactive negatively charged end groups on the polymer chains, which polymer consists of at least 10 chemically combined monomer units, with a compound which is a member of the class consisting of carbon dioxide, carbon bisulfide, 1,2-propylene oxide and ethylene oxide, suitably while having the polymer dissolved in the organic ether solvent in which it is prepared, and at temperatures between −120° and 60° C., whereby the negatively charged end groups of the polymer chemically combine with the carbon dioxide, the carbon disulfide, the propylene oxide or the ethylene oxide and form the corresponding carboxylic acid groups of the formula —COOH, the carbodithiolic acid groups of the formula —CSSH, the hydroxy propyl groups or the 2-hydroxy-ethyl groups of the formula —$CH_2 \cdot CH_2OH$. It may be mentioned that it is advantageous to add the reactant, i.e. the $CO_2$, $CS_2$, $C_3H_6O$ or $C_2H_4O$, at a rapid rate so that all of the polymer is quickly contacted with said reactant.

The product is recovered in usual ways, suitably by making the resulting solution acidic with an aqueous solution of a hydrohalic acid, e.g. an aqueous 6-normal solution of hydrobromic or hydrochloric acid, filtering the solution to remove precipitated salt and evaporating the filtrate to recover the polymer as residue or by evaporating the solvent. The product can be recovered by pouring the filtered solution of the polymer into a non-solvent for the polymer such as hexane or heptane to precipitate the same and separating, washing and drying the product.

The following examples illustrate ways in which the principle of the invention has been applied, but are not to be construed as limiting its scope.

*Example 1*

Polystyrene consisting of "living" polymer chains was prepared by placing 85.6 ml. of a 0.462-normal solution of sodium alpha-methyl styrene addition compound in tetrahydrofurane as catalyst in a clean dry reaction vessel free from oxygen or air. The solution was stirred and maintained at a temperature of 5° C. while adding dropwise 200 ml. of a 10 weight percent solution of monomeric styrene in anhydrous tetrahydrofurane. The resulting solution was a bright red color. Carbon dioxide gas was introduced into the solution until the red color faded. Thereafter, aqueous 6-normal hydrochloric acid solution was added in amount sufficient to bring the resulting mixture to a pH value of 3. The solution was filtered to remove the solid sodium chloride. The filtrate was evaporated at room temperature under reduced pressure and the residue heated in vacuum at a temperature of 70° C. for a period of 3 hours. There was obtained 31 grams of product. It was analyzed and found to consist of polystyrene having an average of one —COOH group per 11 aromatic nuclei in the polymer.

*Example 2*

Polystyrene in the form of "living" polymer, i.e. polystyrene having reactive carbonions on the ends of the polymer chains, was prepared by placing 112.1 ml. of a 0.354-normal solution of sodium alpha-methyl styrene addition compound in tetrahydrofurane in a dry evacuated reaction vessel and adding dropwise 250 ml. of a 10 weight percent solution of monomeric styrene in tetrahydrofurane with stirring while maintaining the resulting mixture at a temperature of 5° C. Thereafter, 6 ml. of carbon bisulfide was added. The resulting mixture was made acidic to a pH of 3 by adding 24 ml. of an aqueous 6-normal hydrochloric acid solution. The mixture was filtered to remove sodium chloride. The filtrate was evaporated to remove the solvent. The residue was heated in vacuum at a temperature of 70° C. for a period of 3 hours. There was obtained 38 grams of product. It was analyzed and found to consist of polystyrene containing 0.324 milliequivalent of —CSSH groups per gram of the product.

*Example 3*

Polystyrene in the form of "living" polymer was prepared by adding 250 ml. of a 10 weight percent solution of monomeric styrene in tetrahydrofurane dropwise to a catalyst mixture consisting of 83.3 ml. of a 0.476-normal solution of sodium alpha-methyl styrene addition compound in tetrahydrofurane while maintaining the resulting mixture at a temperature of 5° C. The reacted mixture was a bright red color. Ethylene oxide in gaseous form was introduced into the reacted mixture until the red color faded. Ten milliliters of an aqueous 6-normal hydrochloric acid was added. The resulting mixture was filtered to remove sodium chloride. The filtrate was evaporated and the residue heated in vacuum at a temperature of 70° C. for 3 hours. There was obtained 33 grams of product. It was analyzed and found to consist of polystyrene containing an average of one OH group per 8 aromatic nuclei in the polymer product.

Similar results are obtained when 1,2-propylene oxide is substituted for the ethylene oxide employed in the example.

*Example 4*

A charge of 8.1 grams of styrene was added to a solution of 0.080 gram of sodium naphthalene addition compound in 40 ml. of tetrahydrofurane at a temperature of −80° C. After polymerization of the styrene was completed, carbon dioxide gas was introduced into the red solution. The color disappeared. The clear colorless solution was poured into methyl alcohol to precipitate the polymer. The polymer was separated by filtering, washed, dried in vacuum and weighed. There was obtained 8 grams of product having a molecular weight of 27,000 as determined by viscosity measurements. It was analyzed and found to contain an average of one gram equivalent —COOH group per 15,500 grams of the polymer product.

*Example 5*

A charge of 10 grams of styrene was added to 0.0015 gram mole of sodium naphthalene addition compound in 50 ml. of tetrahydrofurane at a temperature of −80° C. To the resulting red solution of the polystyrene there was added 0.1 gram of ethylene oxide. The color disappeared. The product was precipitated in methyl alcohol, was separated, washed and dried. There was obtained 9.5 grams of product. It was analyzed and found to consist of polystyrene containing terminal —OH groups on polymer chains of the polymeric product.

I claim:

1. A polymeric composition of matter consisting essentially of a homopolymer of a monomeric monoalkenyl aromatic hydrocarbon containing a single benzene nucleus having a single aliphatic radical selected from the group consisting of the vinyl radical and the isopropenyl radical directly attached to a carbon atom of the benzene nucleus, which polymer consists of at least 10 chemically combined monomer units in a polymeric chain and contains on the terminal atoms of the polymer chains, substituent radicals selected from the group consisting of carboxyl radicals of the formula —COOH derived by reaction of the homopolymer with carbon dioxide, carbodithio radicals of the formula —CSSH derived by reaction of the homopolymer with carbon bisulfide, hydroxy propyl radicals of the formula —$C_3H_6OH$ derived by reaction of the homopolymer with 1,2-propylene oxide, and hydroxy ethyl radicals of the formula —$C_2H_4OH$ derived by reaction of the homopolymer with ethylene oxide.

2. A composition as claimed in claim 1, wherein the substituent radicals are carboxy radicals of the formula —COOH.

3. A composition as claimed in claim 1, wherein the substituent radicals are carbodithio radicals of the formula —CSSH.

4. A composition as claimed in claim 1, wherein the substituent radicals are 2-hydroxy ethyl radicals of the formula —CH$_2$·CH$_2$OH.

5. A composition as claimed in claim 1, wherein the polymerized alkenyl aromatic hydrocarbon is polystyrene.

6. A process for making a polymeric composition containing specific end groups on the polymer chains which comprises polymerizing a monomeric monoalkenyl aromatic hydrocarbon containing a single benzene nucleus having a single aliphatic radical selected from the group consisting of the vinyl radical and the isopropenyl radical directly attached to a carbon atom of the benzene nucleus, in a substantially anhydrous inert liquid solvent comprising an organic ether at temperatures between —120° and 60° C. in contact with an initiating polymerization catalyst consisting of an alkali metal hydrocarbon addition compound to form a polymer consisting of at least 10 chemically combined monomer units in a polymeric chain in which the terminal carbon atoms of said chain are reactive negatively charged end groups and thereafter reacting said polymer with a compound selected from the group consisting of carbon dioxide, carbon disulfide, 1,2-propylene oxide and ethylene oxide, in amount corresponding to one gram molecular proportion of said compound per chemically equivalent gram atomic reactive terminal carbon atom in the polymer.

7. A process as claimed in claim 6, wherein the polymerized monoalkenyl aromatic hydrocarbon having reactive negatively charged end groups is reacted with carbon dioxide.

8. A process as claimed in claim 6, wherein the polymerized monoalkenyl aromatic hydrocarbon having reactive negatively charged end groups is reacted with carbon bisulfide.

9. A process as claimed in claim 6, wherein the polymerized monoalkenyl aromatic hydrocarbon having reactive negatively charged end groups is reacted with ethylene oxide.

10. A process as claimed in claim 6, wherein the polymerized monoalkenyl aromatic hydrocarbon having reactive negatively charged end groups is polystyrene.

11. A process as claimed in claim 6, wherein the liquid solvent is tetrahydrofurane.

References Cited in the file of this patent

UNITED STATES PATENTS

| | | |
|---|---|---|
| 2,403,962 | Auer | July 16, 1946 |
| 2,479,618 | Hersberger et al. | Aug. 23, 1949 |
| 2,607,761 | Seymour | Aug. 19, 1952 |
| 2,835,658 | Lang | May 20, 1958 |
| 2,877,212 | Seligman | Mar. 10, 1959 |

OTHER REFERENCES

Science, vol. 124, page 1257, December 1956.

Boundy et al.: "Styrene," page 87, Book Division, Reinhold Pub. Corp., New York, N.Y. (1952).

Immergut et al.: Die Makromolekulare Chemie, 18/19, pages 322–341, March 1956.